United States Patent
Murakami et al.

(10) Patent No.: US 8,672,334 B1
(45) Date of Patent: Mar. 18, 2014

(54) VEHICLE HEIGHT ADJUSTING DEVICE FOR MOTORCYCLE

(71) Applicant: Showa Corporation, Saitama (JP)

(72) Inventors: Yosuke Murakami, Shizuoka (JP); Tadashi Hachisuka, Shizuoka (JP); Takahiro Kasuga, Tochigi (JP); Fumiaki Ishikawa, Tochigi (JP)

(*) Notice: Subject to any disclaimer, the term of this patent is extended or adjusted under 35 U.S.C. 154(b) by 0 days.

(21) Appl. No.: 13/799,759

(22) Filed: Mar. 13, 2013

(30) Foreign Application Priority Data

Sep. 24, 2012 (JP) ................................. 2012-210070

(51) Int. Cl.
*B60G 17/04* (2006.01)
(52) U.S. Cl.
USPC ....................................................... 280/5.514
(58) Field of Classification Search
USPC ............ 280/5.514, 5.515, 5.501, 6.155, 6.15, 280/124.154, 124.157, 124.158, 124.159, 280/124.162, 124.164
See application file for complete search history.

(56) References Cited

U.S. PATENT DOCUMENTS

| | | | | |
|---|---|---|---|---|
| 4,568,101 A | * | 2/1986 | Bleustein et al. | 180/227 |
| 4,779,490 A | * | 10/1988 | Milunas et al. | 477/115 |
| 4,805,102 A | * | 2/1989 | Ise et al. | 701/37 |
| 6,309,324 B1 | * | 10/2001 | Sawa et al. | 477/125 |

FOREIGN PATENT DOCUMENTS

JP   1996-022680 B   8/1997

* cited by examiner

*Primary Examiner* — Faye M. Fleming
(74) *Attorney, Agent, or Firm* — Orum & Roth, LLC; Keith H. Orum

(57) ABSTRACT

In a vehicle height adjusting device for a motorcycle, the vehicle height is adjusted on the basis of proper vehicle speed information when a failure occurs in a vehicle speed sensor. In the vehicle height adjusting device for a motorcycle, when a failure occurs in a vehicle speed sensor, a control section adjusts vehicle height by using vehicle speed information calculated from an engine speed signal, a shift position signal of a transmission, and an ON/OFF signal of a clutch.

5 Claims, 10 Drawing Sheets

VEHICLE HEIGHT ADJUSTING DEVICE FOR MOTORCYCLE

BACKGROUND OF THE INVENTION

1. Field of the Invention

The present invention relates to a vehicle height adjusting device for a motorcycle.

2. Description of the Related Art

As a vehicle height adjusting device for a motorcycle, there is a vehicle height adjusting device for a vehicle employing a hydraulic attenuator as described in Japanese Examined Patent Publication No. H8-22680. The vehicle height adjusting device is a vehicle height two-stage adjusting device for reducing vehicle height during a stop and increasing the vehicle height during traveling. The vehicle height adjusting device can extend the hydraulic attenuator making use of an extension and compression action of the hydraulic attenuator to increase the vehicle height and arbitrarily change the vehicle height to a low position.

Specifically, a control valve is operated by an electromagnetic actuator actuated by manual operation or automatic operation making use of ejected oil by a pumping action due to stretching vibration of the hydraulic attenuator. The position of the control valve is selected to be a position for increasing the vehicle height and a position for reducing the vehicle height, whereby the vehicle height is arbitrarily switched to predetermined height or predetermined lowness.

Patent Literature Japanese Examined Patent Publication No. H8-22680

SUMMARY OF THE INVENTION

In the vehicle height adjusting device for a motorcycle described in Japanese Examined Patent Publication No. H8-22680, it is conceivable to adjust the vehicle height according to a detection result of a vehicle speed sensor, predict, for example, a stop of the vehicle to control the vehicle height to a low position, and secure stepping stability of a rider.

However, when a failure such as braking wire of a signal line of the vehicle speed sensor occurs during driving of the vehicle, inconvenience is caused in that the adjustment of the vehicle height cannot be performed.

An object of the present invention is to provide a vehicle height adjusting device for a motorcycle that adjusts a vehicle height on the basis of correct vehicle speed information when a failure of a vehicle speed sensor occurs.

According to a first aspect of the present invention, there is provided a vehicle height adjusting device for a motorcycle including: a damper interposed between a vehicle body and an axle; a hydraulic pump configured to perform a pumping action according to the extension/compression motion of the damper to eject hydraulic oil in the damper; a hydraulic jack configured to receive and discharge the hydraulic oil ejected by the hydraulic pump to displace vehicle height; a change-over valve configured to implement switching to connect the hydraulic jack to an oil reservoir chamber of the damper; a vehicle speed sensor configured to detect vehicle speed; and control means for controlling switching of the change-over valve according to a detection result of the vehicle speed sensor, whereby adjusting the vehicle height. When a failure occurs in the vehicle speed sensor, the control means adjusts a vehicle height by using vehicle speed information calculated from an engine speed signal, a shift position signal of a transmission, and an ON/OFF signal of a clutch.

According to a second aspect of the present invention, there is provided a vehicle height adjusting device for a motorcycle including: a damper interposed between a vehicle body and an axle; a hydraulic pump configured to perform a pumping action according to the extension/compression motion of the damper to eject hydraulic oil in the damper; a hydraulic jack configured to receive and discharge the hydraulic oil ejected by the hydraulic pump to displace vehicle height; a change-over valve configured to implement switching to connect the hydraulic jack to an oil reservoir chamber of the damper; a vehicle speed sensor configured to detect vehicle speed; and control means for controlling switching of the change-over valve according to a detection result of the vehicle speed sensor, whereby adjusting the vehicle height. The control means includes a map in which vehicle speeds calculated from engine speeds and shift positions of a transmission are stored in advance. When a failure occurs in the vehicle speed sensor, the control means adjusts the vehicle height by using vehicle speed information calculated from an engine speed signal and a shift position signal of the transmission according to the map.

According to a third aspect of the present invention, in the first and second aspects, the control means predicts a stop state and a traveling state of the motorcycle by using the vehicle speed information and adjusts the vehicle height on the basis of a result of the prediction.

According to a fourth aspect of the present invention, there is provided a vehicle height adjusting device for a motorcycle including: a damper interposed between a vehicle body and an axle; a hydraulic pump configured to perform a pumping action according to the extension/compression motion of the damper to eject hydraulic oil in the damper; a hydraulic jack configured to receive and discharge the hydraulic oil ejected by the hydraulic pump to displace vehicle height; a change-over valve configured to implement switching to connect the hydraulic jack to an oil reservoir chamber of the damper; a vehicle speed sensor configured to detect vehicle speed; and control means for controlling switching of the change-over valve according to a detection result of the vehicle speed sensor, whereby adjusting the vehicle height. When a failure occurs in the vehicle speed sensor, the control means predicts traveling or a stop of the vehicle by using a throttle position signal, a shift position signal of a transmission, and an ON/OFF signal of a clutch and adjusts a vehicle height.

First Aspect (a) When a failure of the vehicle speed sensor occurs, the control means adjusts the vehicle height using vehicle information such as a stop or traveling of the vehicle calculated from an engine speed signal detected by an engine speed sensor, a shift position signal of the transmission detected by a shift position sensor, and an ON/OF signal of the clutch detected by a clutch sensor. The engine speed for determining a stop, traveling, and the like of the vehicle is changed between during warming-up and after the warming-up. Consequently, even if the vehicle speed sensor fails, it is possible to execute a vehicle height reducing control mode and a vehicle height increasing control mode based on correct vehicle speed information.

Second Aspect (b) The control means includes the map in which vehicle speeds calculated from engine speeds and shift positions of the transmission are stored in advance. When a failure of the vehicle speed sensor occurs, the control means adjusts, according to the map, the vehicle height using vehicle speed information calculated from an engine speed signal detected by an engine speed sensor and a shift position signal of the transmission detected by a shift position sensor. Consequently, even if the vehicle speed sensor fails, it is possible to execute a vehicle height reducing control mode and a vehicle height increasing control mode based on correct vehicle speed information.

Third Aspect (c) The control means predicts a stop state and a traveling state of the vehicle using the vehicle information in (a) and (b) above and adjusts the vehicle height on the basis of a result of the prediction. For example, the control means predicts a stop of the vehicle to enable a vehicle height reducing operation.

Fourth Aspect (d) When a failure of the vehicle speed sensor occurs, the control means predicts traveling or a stop of the vehicle using a throttle position (or depression at engine manifold) signal detected by a throttle sensor, a shift position signal of the transmission detected by a shift position sensor, and an ON/OFF signal of the clutch detected by a clutch sensor and adjusts the vehicle height. Consequently, even if the vehicle speed sensor fails, it is possible to execute a vehicle height reducing control mode and a vehicle height increasing control mode based on correct vehicle speed information.

When a neutral signal of a shift position or a clutch-off signal continues for a specified time or longer in a state in which a throttle is closed, the control means determines a stop of the vehicle and performs a vehicle height reducing operation.

BRIEF DESCRIPTION OF THE DRAWINGS

FIGS. 2A and 2B show a vehicle height increasing control mode of a rear suspension, wherein FIG. 2A is a sectional view showing a extension stroke and FIG. 2B is a sectional view showing a compression stroke;

FIGS. 5A and 5B show a vehicle height increasing control mode of a front fork, wherein FIG. 5A is a sectional view showing a extension stroke and FIG. 5B is a sectional view showing a compression stroke;

DESCRIPTION OF THE PREFERRED EMBODIMENT

Figure 1:
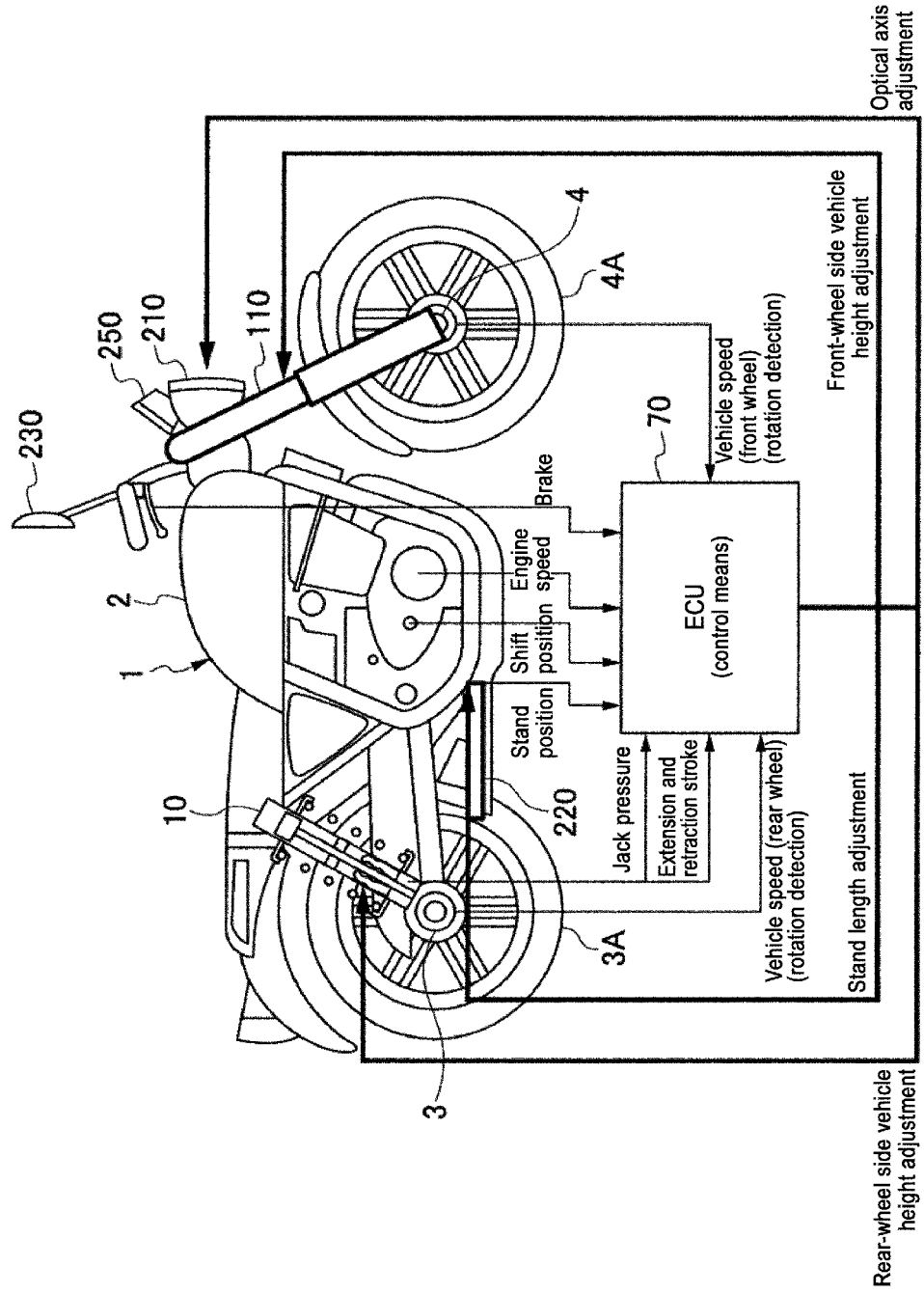
FIG. 1 is a schematic side view of a motorcycle.
Figure 2:
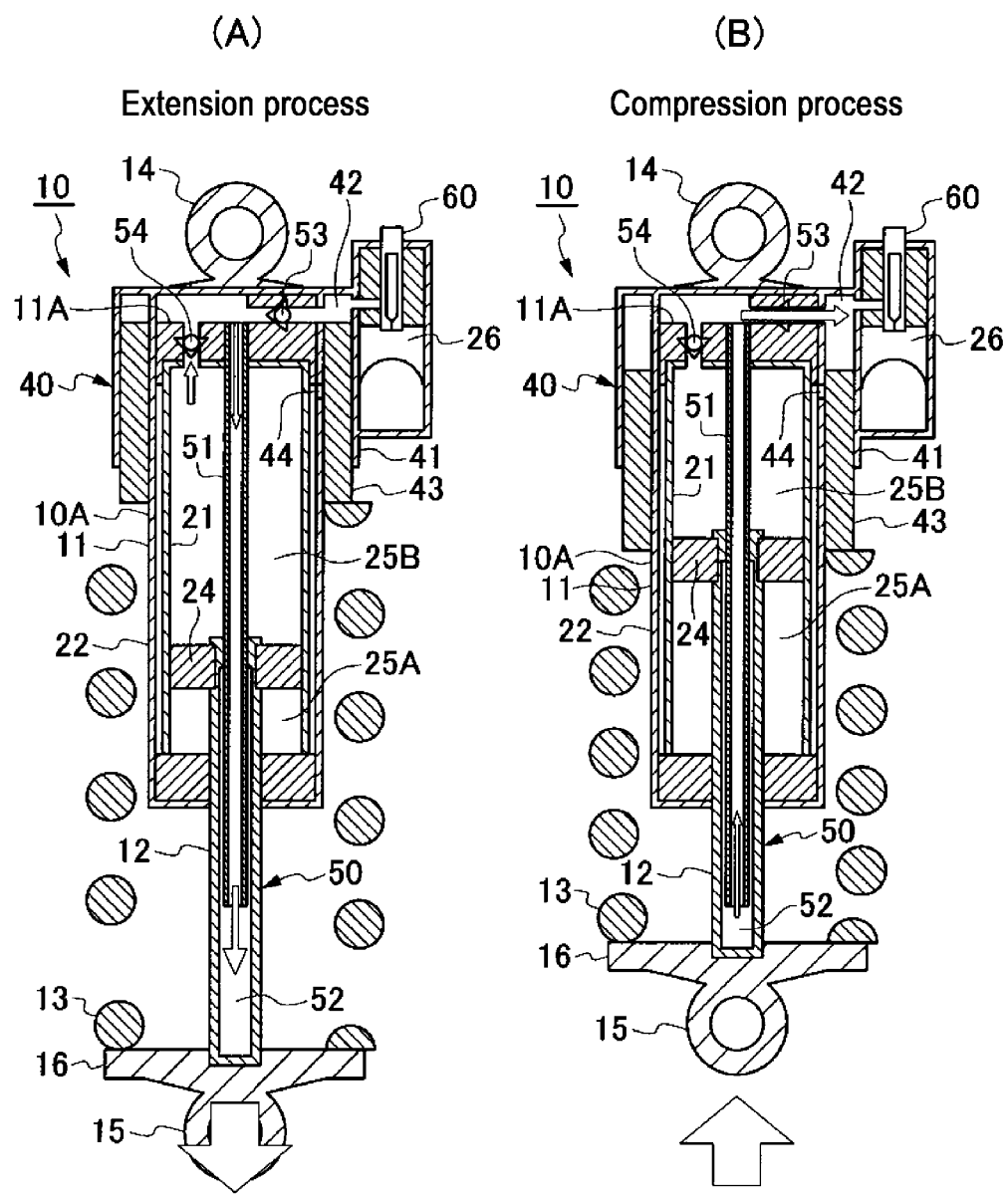

In a motorcycle 1 shown in FIG. 1, a rear suspension 10 is interposed between a vehicle body 2 and a rear axle 3 (a rear wheel 3A) and a front fork 110 is interposed between the vehicle body 2 and a front axle 4 (a front wheel 4A).

Rear Suspension 10 (FIGS. 2A and 2B to FIG. 4 and FIGS. 8 to 10)

The rear suspension 10 includes a damper 10A shown in FIGS. 2A and 2B to FIG. 4 and FIG. 8. The damper 10A includes a damper tube 11 attached to the vehicle body side and a piston rod 12 attached to the axle side. The piston rod 12 slides in the damper tube 11 via a piston 24 and extends and retracts with respect to the damper tube 11. The piston rod 12 includes a suspension spring 13 arranged along the outer circumference of the damper tube 11 and the piston rod 12. A vehicle-body side attachment member 14 is fixed to the upper end portion of the damper tube 11. An axle side attachment member 15 is fixed to the lower end portion of the piston rod 12.

A hydraulic jack 41 of a rear-wheel side vehicle height adjusting device 40 is provided in an outer circumferential section on the upper end side of the damper tube 11. A plunger 43 that divides a jack chamber 42 is inserted into the hydraulic jack 41. The upper end of the suspension spring 13 is supported by the plunger 43. The lower end of the suspension spring 13 is supported by a spring bearing 16 provided in the axle side attachment member 15.

In the rear suspension 10, the damper tube 11 is a double tube including an inner tube 21 and an outer tube 22. The piston 24 is fixed to an insertion end of the piston rod 12 inserted into the inner tube 21. In the rear suspension 10, a lower oil chamber 25A and an upper oil chamber 25B divided by the piston 24 are formed on the inside of the inner tube 21. An oil reservoir chamber 26 is formed along the outer circumference of the outer tube 22. Hydraulic oil is stored in the oil chambers 25A and 25B and the oil reservoir chamber 26. The oil reservoir chamber 26 always communicates with the lower oil chamber 25A or the upper oil chamber 25B and compensates for the hydraulic oil equivalent to the volume of the piston rod 12 involved in the extension and retraction of the rear suspension 10.

The rear suspension 10 includes a damping force generating device 27 (FIG. 8) in a communication path between the lower oil chamber 25A and the upper oil chamber 25B provided in the piston 24 of the piston rod 12. The rear suspension 10 further includes a damping force generating device 28 (FIG. 8) in a communication path between the upper oil chamber 25B and the oil reservoir chamber 26 provided in the damper tube 11. The damping force generating devices 27 and 28 attenuate stretching vibration of the damper tube 11 and the piston rod 12 involved in absorption of an impact force from the road surface by the suspension spring 13.

In the rear-wheel side vehicle height adjusting device 40, as shown in FIGS. 2A and 2B to FIG. 4 and FIG. 8, the hydraulic jack 41 is provided in the outer circumference of the outer tube 22 in the damper tube 11. The hydraulic jack 41 includes the plunger 43 that divides the jack chamber 42. The plunger 43 is projected from the jack chamber 42 by the hydraulic oil supplied to the jack chamber 42. The upper end of the suspension spring 13 is supported on the lower surface of the plunger 43.

Figure 4:
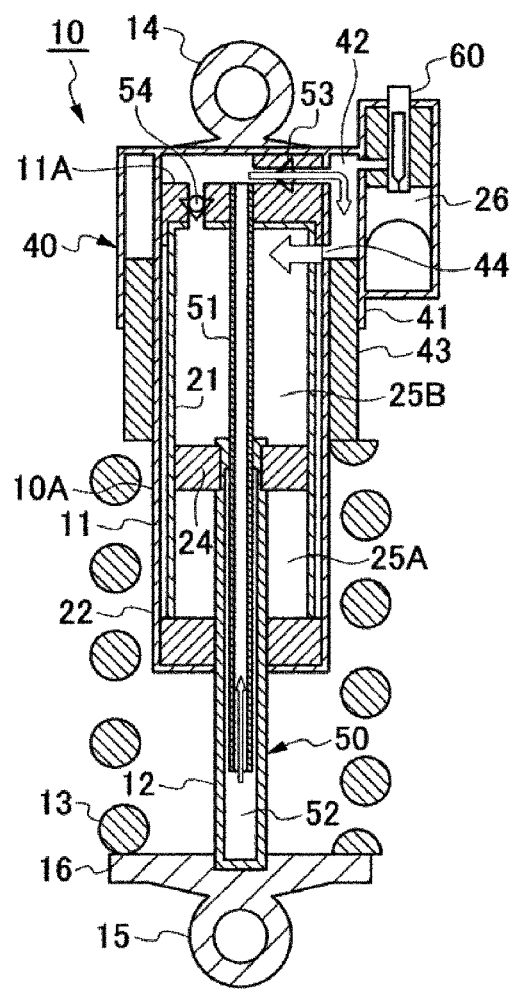
FIG. 4 is a sectional view showing a vehicle height retaining mode of the rear suspension.
Figure 5:
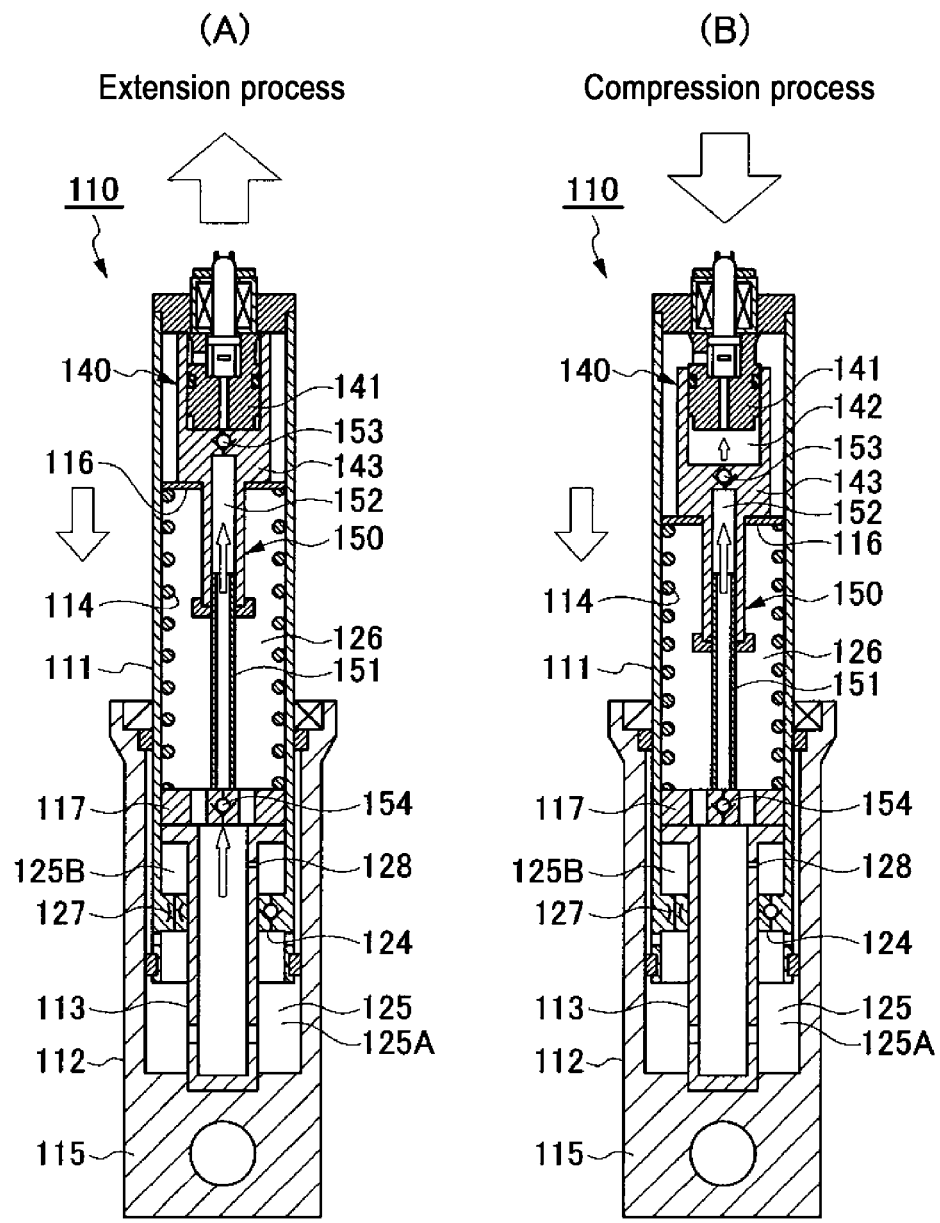

In the hydraulic jack 41, an oil return passage 44 for returning the hydraulic oil in the jack chamber 42 to the oil reservoir chamber 26 when the plunger 43 reaches a projection end of the projection from the jack chamber 42 is provided in the outer tube 22 (FIG. 4).

The rear-wheel side vehicle height adjusting device includes a hydraulic pump 50 configured to perform a pumping action according to the extension/compression motion of the piston rod 12 with respect to the damper tube 11 and supply and discharge the hydraulic oil to and from the jack chamber 42 of the hydraulic jack 41.

In the hydraulic pump 50, a hollow pipe 51 vertically provided in an end piece 11A of the damper tube 11 is slidably inserted into a pump chamber 52 formed by a hollow section of the piston rod 12.

The hydraulic pump 50 includes a check valve for ejection 53 configured to eject, to the side of the hydraulic jack 41, the hydraulic oil in the pump chamber 52 pressurized by the retracting motion of the piston rod 12 entering the damper tube 11 and the hollow pipe 51 (FIG. 2B). The hydraulic pump 50 further includes a check valve for suction 54 configured to suck the hydraulic oil in the inner tube 21 of the damper tube 11 into the pump chamber 52 in which negative pressure is generated by the extending motion of the piston rod 12 exiting the damper tube 11 and the hollow pipe 51 (FIG. 2A).

Therefore, when the vehicle travels and the rear suspension 10 is vibrated by unevenness of the road surface, the hydraulic pump 50 performs the pumping action according to the extension/compression motion of the piston rod 12 entering and exiting the damper tube 11 and the hollow pipe 51. When the pump chamber 52 is pressurized by the pumping action due to the retracting motion of the piston rod 12, the oil in the pump chamber 52 opens the check valve for ejection 53 to be ejected to the side of the hydraulic jack 41. When negative pressure is generated in the pump chamber 52 by the pumping action due to the extending motion of the piston rod 12, the oil in the upper oil chamber 25B of the damper tube 11 opens the check valve for suction 54 to be sucked into the pump chamber 52.

Figure 3:
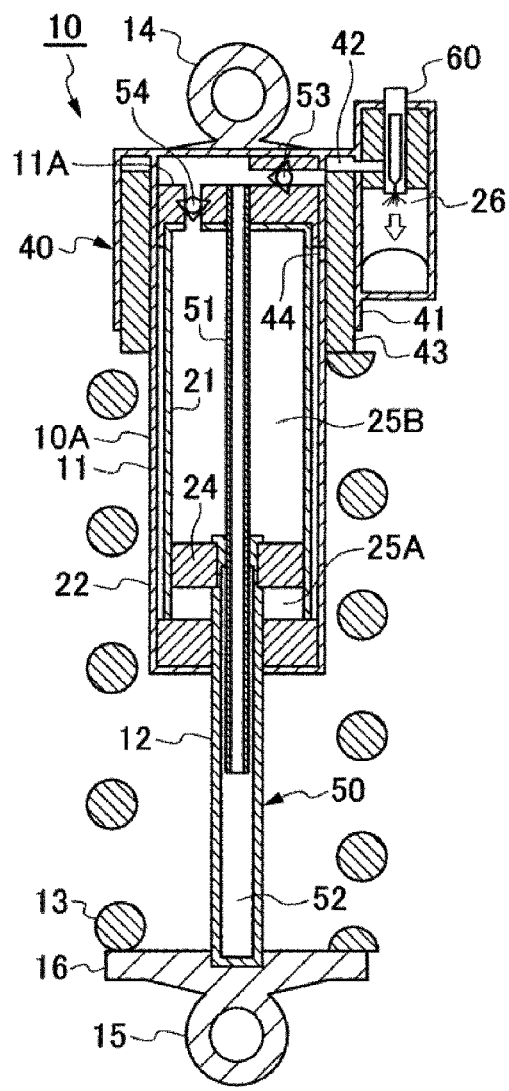
FIG. 3 is a sectional view showing a vehicle height reducing control mode of the rear suspension.

The rear-wheel side vehicle height adjusting device 40 includes a change-over valve 60 configured to close to stop the hydraulic oil supplied to the jack chamber 42 of the hydraulic jack 41 and open to discharge the hydraulic oil to the oil reservoir chamber 26 (or the oil chambers 25A and 25B of the dumper tube 11) as shown in FIG. 3. The rear-wheel side vehicle height adjusting device 40 includes a control circuit shown in FIGS. 8 and 9. According to opening and closing control for the change-over valve 60 by an ECU (control means) 70, the rear-wheel side vehicle height adjusting device 40 adjusts the liquid level of the hydraulic oil supplied to the jack chamber 42 of the hydraulic jack 41 by the hydraulic pump 50, which performs the pumping action according to the extension/compression motion of the piston rod 12 with respect to the damper tube 11, and the projecting height of the plunger 43 projecting from the jack chamber 42 and controls the vehicle height of the vehicle.

Front Fork 110 (FIGS. 5A and 5B to FIG. 7)

As shown in FIGS. 5A and 5B to FIG. 7, the front fork 110 includes a damper 110A. The damper 110A includes a damper tube 111 attached to the vehicle body side and a bottom tube 112 and a piston rod 113 attached to the axle side. The damper tube 111 is slidably inserted into the bottom tube 112 from the upper end opening of the bottom tube 112. The piston rod 113 is vertically provided in the center on the inside of the bottom tube 112. The piston rod 113 slides in an oil chamber 125 on the lower end side of the damper tube 111 and extends and retracts with respect to the damper tube 111. A suspension spring 114 is arranged in an oil reservoir chamber 126 on the upper end side of the damper tube 111. A not-shown vehicle-body side attachment member is fixed to the upper end portion of the damper tube 111. An axle side attachment member 115 is fixed to the lower end portion of the bottom tube 112.

A hydraulic jack 141 of the front-wheel side vehicle height adjusting device 140 is provided at the upper end portion of the damper tube 111. A plunger 143 that divides the jack chamber 142 is fit in the hydraulic jack 141. The upper end of the suspension spring 114 is supported by the plunger 143 via a spring bearing 116. The lower end of the suspension spring 114 is supported by an end piece and spring bearing 117 provided at the upper end of the piston rod 113.

The front fork 110 fixedly includes, on the lower end side of the damper tube 111, a piston 124 configured to slide along the outer circumference of the piston rod 113. In the front fork 110, a lower oil chamber 125A and an upper oil chamber 125B divided by the piston 124 are formed along the outer circumference of the piston rod 113. An oil reservoir chamber 126 is formed along the inner circumference of the piston rod 113 and the upper inner circumference of the damper tube 111. The hydraulic oil is stored in the oil chambers 125A and 125B and the oil reservoir chamber 126. The oil reservoir chamber 126 always communicates with the lower oil chamber 125A or the upper oil chamber 125B and compensates for the hydraulic oil equivalent to the volume of the damper tube 111 involved in the extension and retraction of the front fork 110.

The front fork 110 includes a damping force generating device 127 in a communication path between the lower oil chamber 125A and the upper oil chamber 125B provided in the piston 124 of the damper tube 111. The front fork 110 further includes a damping force generating device 128 in a communication path between the lower and upper oil chambers 125A and 125B and the oil reservoir chamber 126 provided in the piston rod 113. The damping force generating devices 127 and 128 attenuate stretching vibration of the damper tube 111, the bottom tube 112, and the piston rod 113 involved in absorption of an impact force from the road surface by the suspension spring 114.

In the front-wheel side vehicle height adjusting device 140, as shown in FIGS. 5A and 5B to FIG. 7, the hydraulic jack 141 is provided at the upper end portion of the damper tube 111. The hydraulic jack 141 includes the plunger 143 that divides the jack chamber 142. The plunger 143 is projected from the jack chamber 142 by the hydraulic oil supplied to the jack chamber 142. The upper end of the suspension spring 114 is supported on the lower surface of the plunger 143.

Figure 7:
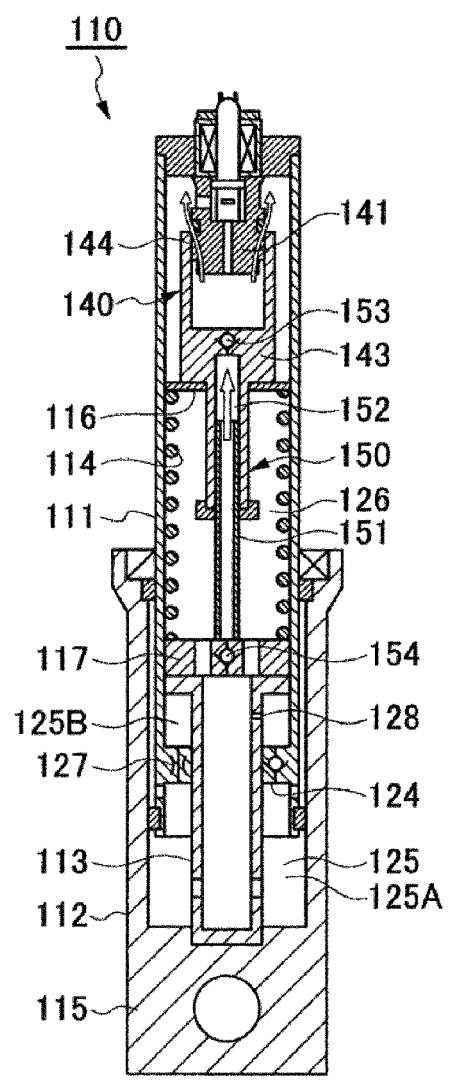
FIG. 7 is a sectional view showing a vehicle height retaining mode of the front fork.

In the hydraulic jack 141, an oil return passage 144 for returning the hydraulic oil in the jack chamber 142 to the oil reservoir chamber 126 when the plunger 143 reaches a projection end of the plunger 143 projected from the jack chamber 142 is provided in the hydraulic jack 141 (FIG. 7).

The front-wheel side vehicle height adjusting device 140 includes a hydraulic pump 150 configured to perform a pumping action according to the extension/compression motion of the piston rod 113 with respect to the damper tube 111 and supply and discharge the hydraulic oil to and from the jack chamber 142 of the hydraulic jack 141.

In the hydraulic pump 150, a hollow pipe 151 vertically provided in the end piece 117 of the piston rod 113 is slidably inserted into a pump chamber 152 formed by a hollow section of the plunger 143.

The hydraulic pump 150 includes a check valve for ejection 153 configured to eject, to the side of the hydraulic jack 141, the hydraulic oil in the pump chamber 152 pressurized by the retracting motion of the piston rod 113 and the hollow pipe 151 entering the damper tube 111 (FIG. 5B). The hydraulic pump 150 further includes a check valve for suction 154 configured to suck the hydraulic oil in the oil reservoir chamber 126 into the pump chamber 152 in which negative pressure is generated by the extending motion of the piston rod 113 and the hollow pipe 151 exiting the damper tube 111 (FIG. 5A).

Therefore, when the vehicle travels and the front fork 110 is vibrated by unevenness of the road surface, the hydraulic pump 150 performs the pumping action according to the extension/compression motion of the piston rod 113 and the hollow pipe 115 entering and exiting the damper tube 111. When the pump chamber 152 is pressurized by the pumping action due to the retracting motion of the piston rod 113, the oil in the pump chamber 152 opens the check valve for ejection 153 to be ejected to the side of the hydraulic jack 141. When negative pressure is generated in the pump chamber 152 by the pumping action due to the extending motion of the piston rod 113, the oil in the oil reservoir chamber 126 opens the check valve for suction 154 to be sucked into the pump chamber 152.

Figure 6:
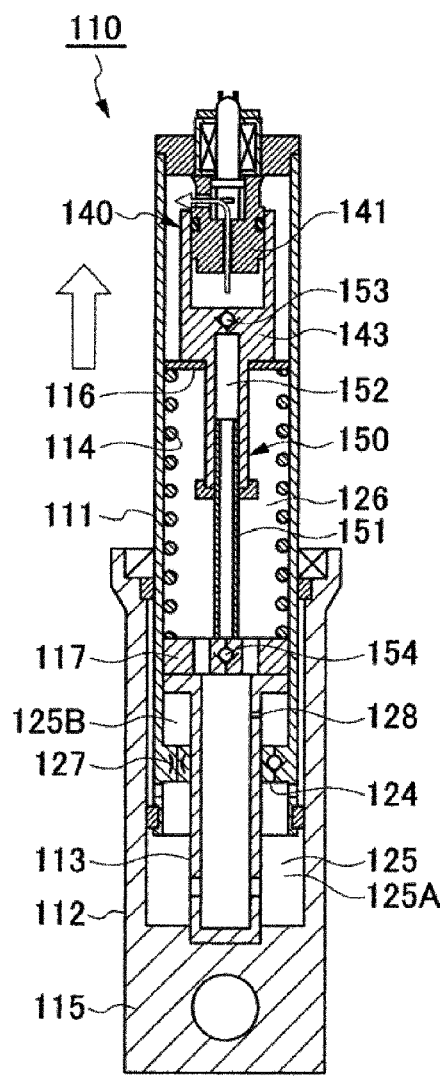
FIG. 6 is a sectional view showing a vehicle height reducing control mode of the front fork.

The front-wheel side vehicle height adjusting device 140 includes a change-over valve 160 (not shown in the figure) configured to close to stop the hydraulic oil supplied to the jack chamber 142 of the hydraulic jack 141 and open to discharge the hydraulic oil to the oil reservoir chamber 126 as shown in FIG. 6. The rear-wheel side vehicle height adjusting device 140 includes a control circuit same as the control circuit of the rear-wheel side vehicle height adjusting device 40 shown in FIGS. 8 and 9. According to opening and closing control for the change-over valve 160 by the ECU (control means) 70, the front-wheel side vehicle height adjusting device 140 adjusts the liquid level of the hydraulic oil supplied to the jack chamber 142 of the hydraulic jack 141 by the hydraulic pump 150, which performs the pumping action according to the extension/compression motion of the piston rod 113 with respect to the damper tube 111, and the projecting height of the plunger 143 projecting from the jack chamber 142 and controls the vehicle height of the vehicle.

The ECU 70 in this embodiment obtains detection signals of vehicle height detecting means 80 (front-wheel side vehicle height detecting means 80F and rear-wheel side vehicle height detecting means 80R), a vehicle speed sensor 91 (a front wheel speed sensor 91F that detects rotating speed of the front wheel 4A and a rear wheel speed sensor 91R that detects rotating speed of the rear wheel 3A), a shift position sensor 92, a G sensor (acceleration sensor) 93, a side stand sensor 94, an engine speed sensor 95, a brake sensor 96, a clutch sensor 97, and the like and subjects the change-over valve 60 (or the change-over valve 160) configured by an electromagnetic valve to ON/OFF control.

As the vehicle height detecting means 80 (the front-wheel side vehicle height detecting means 80F or the rear-wheel side vehicle height detecting means 80R), one of projection height detecting means 81 for the plunger 43 in the hydraulic jack 41 (or the plunger 143 in the hydraulic jack 141), hydraulic pressure detecting means 82 for the jack chamber 42 in the hydraulic jack 41 (or the jack chamber 142 in the hydraulic jack 141), and extension and retraction stroke length detecting means 83 for the piston rod 12 with respect to the damper tube 11 (or the piston rod 113 with respect to the damper tube 111) or a combination of two or more of those components can be adopted.

Figure 8:
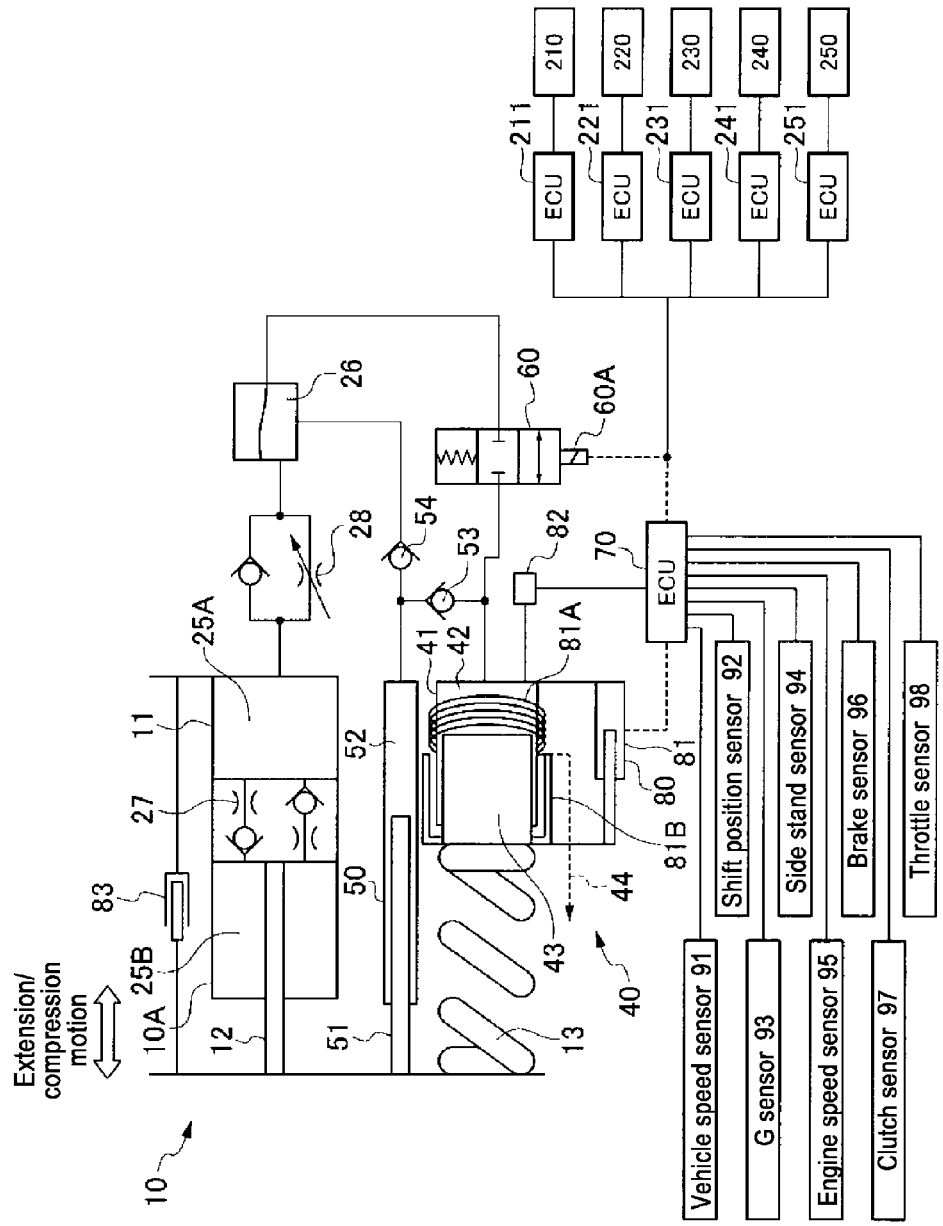
FIG. 8 is a control circuit diagram showing a vehicle height adjusting device.

In the projection height detecting means 81 for the plunger 43, specifically, for example, as shown in FIG. 8, a coil 81A is wound around the outer circumference of the hydraulic jack 41 and the outer circumference of the hydraulic jack 41 is covered with a cover 81B provided in the plunger 43. The projection height detecting means 81 changes the impedance of the coil 81A according to the displacement of the plunger 43. An output of the coil 81A is transmitted to the ECU 70 via a signal processing circuit 81C. The ECU 70 detects the projection height of the plunger 43 according to an oscillation frequency of the coil 81A output by the signal processing circuit 81C.

Figure 9:
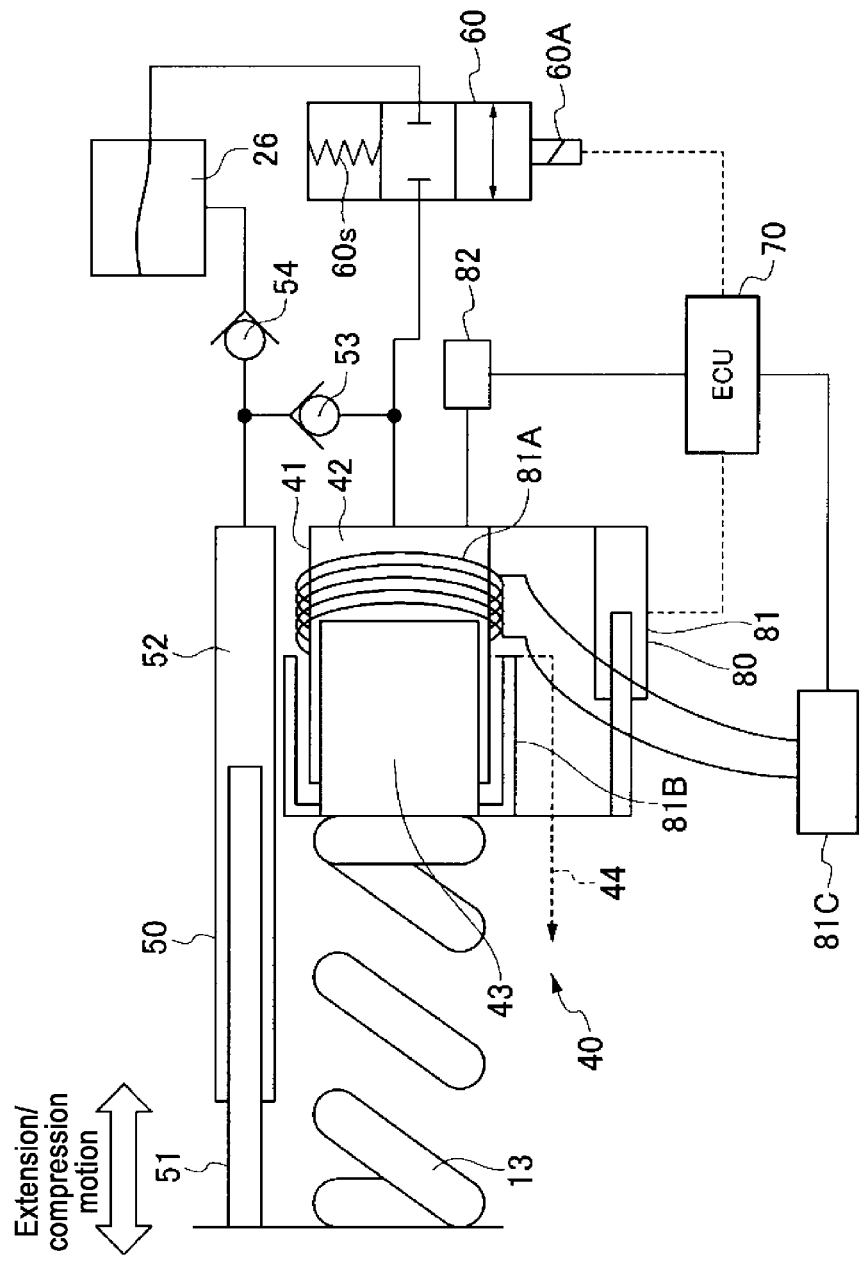
FIG. 9 is a circuit diagram showing an example of a control circuit.

Concerning a vehicle height adjusting operation for the motorcycle 1, the rear-wheel side vehicle height adjusting device 40 of the rear suspension 10 employing the control circuit shown in FIGS. 8 and 9 including the change-over valve configured by a single two-port two-position electromagnetic valve is explained in detail. A vehicle height adjusting operation by the front-wheel side vehicle height adjusting device 140 of the front fork 110 is substantially the same.

In a vehicle height reducing control mode in which the ECU 70 outputs an ON signal, the change-over valve 60 opens to connect the jack chamber 42 of the hydraulic jack 41 to the oil reservoir chamber 26 of the damper tube 11. Therefore, the hydraulic pump 50 discharges the hydraulic oil supplied to the jack chamber 42 of the hydraulic jack 41 to the oil reservoir chamber 26 to reduce the liquid level of the jack chamber 42 and the projection height of the plunger 43 to enable a vehicle height reducing operation.

On the other hand, in a vehicle height increasing control mode in which the ECU 70 outputs an OFF signal, the change-over valve 60 closes to shut off the jack chamber 42 of the hydraulic jack 41 from the oil reservoir chamber 26 of the damper tube 11. Therefore, the hydraulic pump 50 does not discharge the hydraulic oil supplied to the jack chamber 42 of the hydraulic jack 41 to enable a vehicle height maintaining or vehicle height increasing operation. At this point, according to the pumping action due to the extending motion of the piston rod 12, the hydraulic pump 50 enables the oil in the lower oil chamber 25A of the damper tube 11 to be sucked into the pump chamber 52 from the check valve for suction 54. According to the pumping action due to the retracting motion of the piston rod 12, the hydraulic pump 50 supplies the oil in the pump chamber 52 to the jack chamber 42 of the hydraulic jack 41 from the check valve for discharge 53 to enable the vehicle height increasing operation.

The change-over valve 60 is a normal close valve in FIGS. 8 and 9. However, the change-over valve 60 may be a normal open valve.

Specifically, control modes by the rear-wheel side vehicle height adjusting device 40 are as explained below.

(A) Vehicle Height Reducing Control Mode

In the rear-wheel side vehicle height adjusting device 40, during traveling or during a long-time stop of the vehicle, the ECU 70 shifts to a vehicle height reducing control mode for opening the change-over valve 60 according to any one of control conditions 1 to 3 explained below under a vehicle height increasing control mode for closing the change-over valve 60 to enable the vehicle height increasing operation.

When the ECU 70 enters the vehicle height reducing control mode and opens the change-over valve 60 from the closed state, the ECU 70 reduces an applied voltage to the change-over valve 60 to a solenoid opening retaining voltage E2 at an opening retaining stage in a fixed time after the opening and saves a solenoid current supplied to the change-over valve 60 compared with an initial applied voltage (a solenoid opening initial voltage E1) at the time when the change-over valve 60 is opened from the closed state. For example, E1=12V and E2=4V.

When the solenoid is in the opening retaining state, a normal voltage (a voltage during startup) is applied to the solenoid at an interval of a fixed time. Consequently, it is possible to prevent the solenoid from malfunctioning because of vibration or the like and restore the solenoid from a malfunction state.

1. Vehicle Speed Control

When vehicle speed V of the vehicle, i.e., in this embodiment, wheel speed V detected by the vehicle speed sensor (the front wheel speed sensor 91F and the rear wheel speed sensor 91R) is equal to or lower than vehicle height reducing wheel speed Vd (V≤Vd), the ECU 70 enters the vehicle height reducing control mode and opens the change-over valve 60 to enable the vehicle height reducing operation.

The ECU 70 sets the vehicle height reducing speed Vd in advance. Vd is, for example, 10 km/h.

2. Stop Prediction Time Control

The ECU 70 predicts a stop prediction time T of the vehicle. When the predicted stop prediction time T is equal to or smaller than a predetermined reference stop time Ta (T≤Ta), the ECU 70 enters the vehicle height reducing control mode and opens the change-over valve 60 to enable the vehicle height reducing operation.

The ECU 70 calculates deceleration from the wheel speed of the vehicle detected by the vehicle speed sensor 91 (the front wheel speed sensor 91F and the rear wheel speed sensor 91R) or detects deceleration from the G sensor 93 and predicts the stop prediction time T from the deceleration.

The ECU 70 sets the reference stop time Ta as a discharge time for the hydraulic oil filled in the jack chamber 42 of the hydraulic jack 41 (time for discharging the hydraulic oil from the jack chamber 42 to the oil reservoir chamber 26 of the damper tube 11 via the change-over valve 60).

At this point, the ECU 70 sets in advance reference wheel speed Va at which the prediction of the stop prediction time T should be started. When the wheel speed V of the vehicle is equal to or lower than the reference wheel speed Va (V≤Va), the ECU 70 predicts the stop prediction time T.

In the stop prediction time control, instead of the control conditions T≤Ta and V≤Va, when deceleration α of the vehicle is equal to or higher than predetermined reference deceleration αa (α≥αa), the ECU 70 may enter the vehicle height reducing control mode and open the change-over valve 60 to enable the vehicle height reducing operation.

The ECU 70 sets the reference wheel speed Va, the reference stop time Ta, and the reference acceleration αa in advance. Va is, for example, 40 km/h, Ta is, for example, 2.5 sec, and αa is, for example, 4 km/h/sec.

The stop prediction time is a parameter representing time when the traveling vehicle stops in the nearest future predicted and calculated from a vehicle motion parameter at every moment. The stop prediction time has a dimension of time.

When an actual comparison operation is preformed, the comparison operation could be a comparison operation that seemingly does not calculate an order of "time" because, for example, the dimension of time is divided to both sides of a comparison expression or comparison is performed for each element.

For example, one of most simple arithmetic expressions for the stop prediction time is $T = -V/\alpha = -V \cdot dt/dV$ (an arithmetic expression assuming uniformly accelerated motion). All three comparison expressions below have the same meaning. Even if a difference in a comparing method occurs due to convenience of calculation, in actual meaning, a comparison operation for the stop prediction time is performed.

$T < c$ ($c$ is a threshold, $c = Ta$)

$V < -c \cdot \alpha$ $-\alpha > c \cdot V$

In an example in which the comparison is performed for each element, for example, comparison is performed for each of elements V and α for calculating the stop prediction time as in $(V < c_1) \cap (-\alpha > c_2)$ ($c_1$ and $c_2$ are thresholds) and AND is calculated.

In this case, from $T = -V/\alpha$, Ta can be represented as $Ta = (-c_1)/(-c_2) = c_1/c_2$.

3. Side Stand Control

When it is detected by the side stand sensor 94 that the side stand of the vehicle is changed from a standby position to a work position, the ECU 70 enters the vehicle height reducing control mode and opens the change-over valve 60 to enable the vehicle height reducing operation. The ECU 70 monitors wheel speed with the vehicle speed sensor 91 (the front wheel speed sensor 91F and the rear wheel speed sensor 91R). The ECU 70 can perform, for example, control for not performing, when the wheel speed is equal to or higher than very low speed (e.g., 5 km/s), the reducing control even if the stand position is the work position and carrying out the reducing control only when the wheel speed is 0.

(B) Vehicle Height Increasing Control Mode

In the rear-wheel side vehicle height adjusting device 40, the ECU 70 shifts to the vehicle height increasing control mode for closing the change-over valve 60 according to any one of control conditions 1 to 4 explained below during the vehicle height reducing control mode in which the change-over valve 60 is opened and retained according to (A) above.

When the ECU 70 enters the vehicle height increasing control mode and closes the change-over valve 60 from the open state, the ECU 70 turns off the applied voltage E0 to the change-over valve 60 (E0=0V).

1. Wheel Speed Control

When the wheel speed V of the vehicle detected by the vehicle speed sensor 91 (the front wheel speed sensor 91F and the rear wheel speed sensor 91R) exceeds the vehicle height reducing wheel speed Vd (or vehicle height increasing wheel speed Vu set independently from the vehicle height reducing wheel speed Vd) (V>Vd or V>Vu), the ECU 70 suspends the vehicle height reducing control mode, enters the vehicle height increasing control mode, and closes the change-over valve 60 to enable the vehicle height increasing operation.

The ECU 70 sets the vehicle height reducing wheel speed Vd (or the vehicle height increasing wheel speed Vu) in advance. Vd or Vu is, for example, 40 km/h.

2. Stop Prediction Time Control

The ECU 70 predicts the stop prediction time T of the vehicle and, when the predicted stop prediction time T exceeds a predetermined secondary reference stop time Tb (T>Tb), suspends the vehicle height reducing control mode, enters the vehicle height increasing control mode, and closes the change-over valve 60 to enable the vehicle height increasing operation.

The ECU 70 predicts the stop prediction time T of the vehicle from deceleration (or acceleration) of the vehicle.

At this point, the ECU 70 sets in advance secondary reference wheel speed Vb at which prediction of the stop time T of the vehicle should be started and, when the wheel speed V of the vehicle detected by the vehicle speed sensor 91 (the front wheel speed sensor 91F and the rear wheel speed sensor 91R) exceeds the secondary reference wheel speed Vb (V>Vb), predicts the stop prediction time T.

In the stop prediction time control, instead of the control conditions T>Tb and V>Vb explained above, when acceleration β of the vehicle exceeds predetermined reference acceleration βb (β>βb), the ECU 70 may suspend the vehicle height reducing control mode, enter the vehicle speed increasing control mode, close the change-over valve 60 to enable the vehicle height increasing operation.

The ECU 70 sets the secondary reference wheel speed Vb, the secondary reference stop time Tb, and the reference acceleration βb in advance. Vb is, for example, 40 km/h, Tb is, for example, 3 sec, and βb is, for example, 5 km/h/sec.

3. Long-Time Stop Control

When a stop time of the vehicle is equal to longer than predetermined continuous stop time Tc, the ECU 70 suspends the vehicle height reducing control mode, enters the vehicle height increasing control mode, closes the change-over valve 60 to enable the vehicle height increasing operation.

The ECU 70 sets the continuous stop time Tc of the vehicle in advance. Tc is, for example, 30 sec.

4. Neutral Control

When the wheel speed V of the vehicle detected by the vehicle speed sensor 91 (the front wheel speed sensor 91F and the rear wheel speed sensor 91R) is 0 and a shift position of the transmission detected by the shift position sensor 92 is neutral, the ECU 70 suspends the vehicle height reducing control mode, enters the vehicle height increasing control mode, and closes the change-over valve 60 to enable the vehicle height increasing operation.

(C) Vehicle Height Retaining Mode

In the rear-wheel side vehicle height adjusting device 40, during traveling of the vehicle, the ECU 70 subjects the change-over valve 60 to opening and closing control according to a detection result of the vehicle height detecting means 80 (the rear-wheel side vehicle height detecting means 80R) to thereby retain the vehicle height at an arbitrary intermediate height position desirably set in advance.

Figure 10:
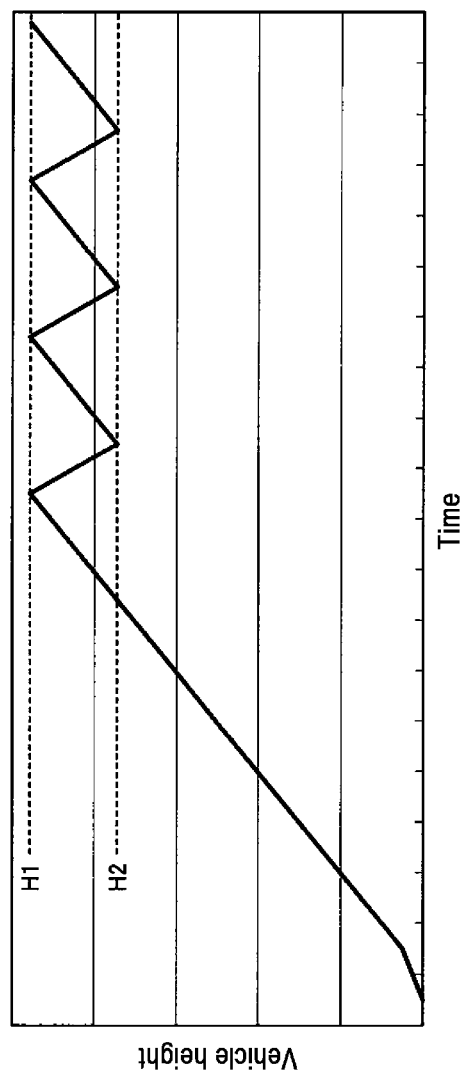
FIG. 10 is a diagram showing an adjusted state of vehicle height.

That is, an upper threshold of vehicle height at which the ECU 70 switches the change-over valve 60 from OFF operation (the vehicle height increasing control mode) to ON operation to open the change-over valve 60 and starts vehicle height reduction is set to H1. A lower threshold of the vehicle height at which the ECU 70 switches the change-over valve 60 from the ON operation (the vehicle height reducing control mode) to the OFF operation to close the change-over valve 60 and starts vehicle height increase is set to H2. Consequently, the ECU 70 retains, according to a detection result of the vehicle height detecting means 80, the vehicle height during traveling of the motorcycle 1 in an intermediate height position between H1 and H2 as shown in FIG. 10.

Therefore, with the rear-wheel side vehicle height adjusting device 40, the vehicle height can be retained in an arbitrary intermediate height position between a maximum height position set by a maximum projectable end of the plunger 43 in the hydraulic jack 41 and a minimum height position set by a minimum retractable end of the plunger 43 in the hydraulic jack 41.

It is possible to instantaneously switch the vehicle height by adopting an electromagnetic valve as the change-over valve 60 functioning as switching means for the vehicle height.

It is possible to estimate vehicle height during detection by adopting the projection height detecting means 81 for the plunger 43 in the hydraulic jack 41 as the vehicle height detecting means 80 (the rear-wheel side vehicle height detecting means 80R).

It is possible to estimate vehicle height during detection by adopting the hydraulic pressure detecting means 82 for the jack chamber 42 in the hydraulic jack 41 as the vehicle height detecting means 80 (the rear-wheel side vehicle height detecting means 80R). Then, it is possible to estimate vehicle weight (movable load) by filtering (low pass) a detection result of the hydraulic pressure detecting means 82. When the vehicle weight is large and the vehicle height begins to be lowered, the vehicle height is increased to avoid bottoming of the damper 10A. When the vehicle weight is small and the vehicle height begins to be higher, the vehicle height is reduced to avoid stretching of the damper 10A.

It is possible to estimate vehicle height during detection by adopting the extension and retraction stroke length detecting means 83 for the piston rod 12 with respect to the damper tube 11 as the vehicle height detecting means 80 (the rear-wheel sided vehicle height detecting means 80R). Then, it is possible to estimate an unevenness state (an amplitude state) of the road surface by filtering (band pass) a detection result of the extension and retraction stroke length detecting means 83. When the amplitude of the road surface is large, the vehicle height is increased to avoid bottoming of the damper 10A or the vehicle height is adjusted to appropriate height to avoid both bottoming and stretching of the damper 10A. When the amplitude of the road surface is small, the vehicle height is reduced to ease the resistance of wind if the vehicle is an on-road vehicle or the vehicle height is reduced to prevent back-and-forth pitching of the vehicle if the vehicle is an off-road vehicle.

(D) Auxiliary Device Control Mode

In the rear-wheel side vehicle height adjusting device 40, the ECU 70 controls, according to a detection signal of the rear-wheel side vehicle height adjusting means 80R, auxiliary devices incidental to the vehicle such as a headlight 210, a side stand 220, a rearview mirror 230, a brake with ABS 240, and a display device 250 as explained below.

Headlight 210

The ECU 70 adjusts, according to the detection signal of the rear-wheel side vehicle height detecting means 80R, the position, the tilt, and the like of an optical axis of the headlight 210 to an optimum state corresponding to the vehicle height. At this point, the ECU 70 performs the adjustment via an ECU 211 for the headlight 210.

Consequently, irrespective of how the vehicle height changes, it is possible to change the optical axis of the headlight 201 to an appropriate optical axis corresponding to the vehicle height. As a result, it is possible to secure a proper illumination range for the rider or eliminate the likelihood of damaging a visual field of an oncoming car.

Side Stand 220

The ECU 70 adjusts, according to the detection signal of the rear-wheel side vehicle height detecting means 80R, the length of the side stand 220 to correspond to the vehicle height during a vehicle stop. At this point, the ECU 70 performs the adjustment via an ECU 221 for the side stand 220.

That is, since it is also likely that, when the vehicle stops in a state in which the vehicle height is large, the side stand 220 does not reach the ground and the vehicle falls down, it is necessary to extend the side stand 220 to allow the vehicle to stably stop. Therefore, the ECU 70 detects the vehicle height during a stop and adjusts the length of the side stand 220.

Rearview Mirror 230

The ECU 70 adjusts, according to the detection signal of the rear-wheel side vehicle height detecting means 80R, the position of the rearview mirror 230 to correspond to the vehicle height. At this point, the ECU 70 performs the adjustment via an ECU 231 for the rearview mirror 230.

That is, irrespective of how the vehicle height changes, the position of the rearview mirror 230 is changed to an appropriate position corresponding to the vehicle height. As a result, rear visual recognition is surely performed.

Brake with ABS 240

The ECU 70 adjusts, according to the detection signal of the rear-wheel side vehicle height detecting means 80R, a threshold of a deceleration change ratio of wheel speed for actuating the ABS of the brake 240 to correspond to the vehicle height. At this point, the ECU 70 performs the adjustment via an ECU 241 for the brake with ABS 240.

That is, irrespective of how the vehicle height changes, it is possible to secure stable brake operability by the ABS.

Display Device 250

The ECU 70 displays the vehicle height on the display device 250 according to the detection signal of the rear-wheel side vehicle height detecting means 80R. At this point, the ECU 70 performs the adjustment via an ECU 251 for the display device 250.

The vehicle height adjusting operation by the rear-wheel side vehicle height adjusting device 40 adopted in the rear suspension 10 in the motorcycle 1 is explained above. However, a vehicle height adjusting operation substantially the same as the (A) the vehicle height reducing control mode, (B) the vehicle height increasing control mode, (C) the vehicle height retaining mode, and (D) the auxiliary device control mode by the rear-wheel side vehicle height adjusting device 40 can be performed using a detection result of the front-wheel side vehicle height detecting means 80F in the front-wheel side vehicle height adjusting device 140 adopted in the front fork 110.

(E) Front and Rear Vehicle Height Associated Control Mode

A vehicle height adjusting operation by the rear suspension 10 in the motorcycle 1 is explained concerning a vehicle height associated control mode associated with the vehicle height adjusting operation by the front fork 100. The rear-wheel side vehicle height adjusting device 40 of the rear suspension 10 includes the hydraulic pump 50 performing the pumping action according to the extension/compression motion of the piston rod 12 to eject hydraulic oil, the hydraulic jack 41 including the plunger 43 projected by the hydraulic oil ejected by the hydraulic pump 50, and the suspension spring 13 supported by the plunger 43 of the hydraulic jack 41. The rear-wheel side vehicle height adjusting device 40 controls the actuation of the hydraulic jack 41 according to a detection result of the rear-wheel side vehicle height detecting means 80R incidental to the rear suspension 10 and adjusts rear-wheel side vehicle height.

The front-wheel side vehicle height adjusting device 140 of the front fork 110 includes the hydraulic pump 150 performing the pumping action according to the extension/compression motion of the piston rod 113 to eject hydraulic oil, the hydraulic jack 141 including the plunger 143 projected by the hydraulic oil ejected by the hydraulic pump 150, and the suspension spring 114 supported by the plunger 143 of the hydraulic jack 141. The front-wheel side vehicle height adjusting device 140 controls the actuation of the hydraulic jack 141 according to a detection result of the front-wheel side vehicle height detecting means 80F incidental to the front fork 110 and adjusts front-wheel side vehicle height.

In the motorcycle 1, an adjusting operation for the rear-wheel side vehicle height by the actuation control for the hydraulic jack 41 included in the rear-wheel side vehicle height adjusting device 40 of the rear suspension 10 and an adjusting operation for the front-wheel side vehicle height by the actuation control for the hydraulic jack 141 included in the front-wheel side vehicle height adjusting device 140 of the front fork 110 are associated with each other to adjust the vehicle height. Consequently, it is possible to stabilize a driving posture of the rider even if the vehicle height of the motorcycle 1 changes.

Therefore, in the motorcycle 1, the ECU 70 can synchronize the adjusting operation for the rear-wheel side vehicle height by the rear-wheel side vehicle height adjusting device 40 and the adjusting operation for the front-wheel side vehicle height by the front-wheel side vehicle height adjusting device 140 to adjust the vehicle height. Consequently, it is possible to displace the vehicle body 2 up and down in parallel with respect to the front and rear axles 3 and 4 and maintain the stability of the driving posture of the rider.

In the motorcycle 1, when the vehicle height is reduced by the rear-wheel side vehicle height adjusting device 40 and the front-wheel side vehicle height adjusting device 140, the ECU 70 can perform the rear-wheel side vehicle height reducing operation by the rear-wheel side vehicle height adjusting device 40 earlier than the front-wheel side vehicle height reducing operation by the front-wheel side vehicle height adjusting device 140 to adjust the vehicle height. Consequently, it is possible to reduce the vehicle height on the rear wheel side earlier and improve stepping stability during a stop.

The vehicle body 2 already leaning forward because of brake operation during a stop is lowered from the rear wheel side first and then the front wheel side is lowered. Consequently, it is possible to ease the leaning-forward of the vehicle body 2.

In the vehicle-height associated control mode of the rear suspension 10 and the front fork 100, the rear suspension 10 may use, as a hydraulic pump that supplies the hydraulic oil to the hydraulic jack 41 of the rear suspension and the hydraulic jack 141 of the front fork 100, the hydraulic pump 50 that performs the pumping action according to the extension/compression motion of the piston rod 12 and ejects the hydraulic oil. However, the front fork 100 can also use, as the hydraulic pump for associated control of the vehicle height by the rear suspension 10 and the front fork 100, the hydraulic pump 150 that performs the pumping action according to the extension/compression motion of the piston rod 124 and ejects the hydraulic oil.

(F) Abnormal Detection Control for Wheel Speed

In the rear-wheel side vehicle height adjusting device (the front-wheel side vehicle height adjusting device 140 as well), the ECU 70 has a control function explained below in order to estimate a driving state of the vehicle from detection results of the front wheel speed sensor 91F and the rear wheel speed sensor 91R and enable adjustment of the vehicle height as explained in (A) to (E) above on the basis of normal detected wheel speed.

i. The ECU 70 adjusts the vehicle height on the basis of higher detected wheel speed of detected wheel speed of the front wheel speed sensor 91F and detected wheel speed of the rear wheel speed sensor 91R.

That is, when one of the detected wheel speed of the front wheel speed sensor 91F and the detected wheel speed of the rear wheel speed sensor 91R is low compared with the other, the ECU 70 estimates the one low wheel speed is caused by an abnormality due to, for example, wheelie of the vehicle (the rotating speed of the front wheel is low) or wheel lock (the rotating speed of the front wheel or the rear wheel is zero) or an abnormality due to a failure such as breaking wire of a signal line of the wheel speed sensor and uses the other high wheel speed not depending on the abnormality detection result as normal wheel speed. Consequently, it is possible to execute the vehicle height reducing control mode or the vehicle height increasing control mode based on a normal detection result of wheel speed. For example, it is possible to predict a stop of the vehicle from the other high normal detected wheel speed and enable the vehicle height reducing operation.

ii. The ECU 70 adjusts the vehicle height on the basis of average wheel speed of the detected wheel speed of the front wheel speed sensor 91F and the detected wheel speed of the rear wheel speed sensor 91R.

That is, since the ECU 70 adjusts the vehicle height on the basis of the average wheel speed of the detected wheel speed of the front wheel speed sensor 91F and the detected wheel speed of the rear wheel speed sensor 91R, even if the one wheel speed is caused by an abnormality due to, for example, wheelie of the vehicle (the rotating speed of the front wheel is low) or wheel lock (the rotating speed of the front wheel or the rear wheel is zero) or an abnormality due to a failure such as breaking wire of a signal line of the wheel speed sensor, the ECU 70 uses, as wheel speed closer to normal wheel speed, the average wheel speed that can dilute the abnormal detection results. Consequently, it is possible to execute the vehicle height reducing control mode or the vehicle height increasing control mode based on a more normal detection result of the wheel speed. For example, a stop of the vehicle is predicted from the wheel speed closer to normal wheel speed to enable the vehicle height reducing operation.

iii. When acceleration or deceleration equal to or larger than a fixed value of the detected wheel speed of the front wheel speed sensor 91F and the detected wheel speed of the rear wheel speed sensor 91R continues for a predetermined time or longer, the ECU 70 determines to stop the adjustment of the vehicle height by detection results of the wheel speed sensors.

That is, when the acceleration or deceleration equal to or larger than the fixed value of the detected wheel speed of the front wheel speed sensor 91F and the detected wheel speed of the rear wheel speed sensor 91R continues for the predetermined time or longer, the ECU 70 estimates that an abnormality of wheel spin (idling of a driving wheel) occurs. Alternatively, when the deceleration equal to or larger than the fixed value of the detected wheel speed of the front wheel speed sensor 91F and the detected wheel speed of the rear wheel speed sensor 91R continues for the predetermined time or longer, the ECU 70 estimates that an abnormality of wheel lock (the rotating speed of the front wheel or the rear wheel is zero) occurs. The ECU 70 suspends the vehicle height reducing control mode or the vehicle height increasing control mode based on the abnormal detection results of the wheel speed sensors. For example, the ECU 70 stops predicting a stop of the vehicle from abnormal detected wheel speed of the wheel speed sensors and performing the vehicle height reducing operation. On condition that the detected wheel speed of the wheel speed sensors returns to normal detected wheel speed, the ECU 70 predicts a stop of the vehicle from the normal detected wheel speed and enables the vehicle height reducing operation.

iv. After determining to stop the adjustment of the vehicle height by the detection result of the deceleration equal to or larger than the fixed value of the detected wheel speed of the front wheel speed sensor 91F and the detected wheel speed of the rear wheel speed sensor 91R in iii above, when a stop state of the detected wheel speed of the wheel speed sensor continues a predetermined time or longer, the ECU 70 determines that the vehicle is stopped and performs the vehicle height reducing operation.

v. After determining to stop the adjustment of the vehicle height by the detection result of the deceleration equal to or larger than the fixed value of the detected wheel speed of the front wheel speed sensor 91F and the detected wheel speed of the rear wheel speed sensor 91R in iii above, on condition that the clutch is disengaged, the ECU 70 determines that the rider intends to stop the vehicle and performs the vehicle height reducing operation.

vi. When the detected wheel speed of the rear wheel speed sensor 91R is higher than the detected wheel speed of the front wheel speed sensor 91F and the detected wheel speed of the rear wheel speed sensor 91R is high speed equal to or larger than a fixed value, the ECU 70 adjusts the vehicle height on the basis of the detected wheel speed of the front wheel speed sensor 91F or on the basis of the average wheel speed of the detected wheel speed of the front wheel speed sensor 91F and the detected wheel speed of the rear wheel speed sensor 91R.

That is, when the detected wheel speed of the rear wheel speed sensor 91R is higher than the detected wheel speed of the front wheel speed sensor 91F and the detected wheel speed of the rear wheel speed sensor 91R is the high speed equal to or larger than the fixed value, the ECU 70 estimates that an abnormality of wheel spin (idling of the rear wheel) occurs in the rear wheel functioning as the driving wheel. The ECU 70 executes the vehicle height reducing control mode or the vehicle height increasing control mode on the basis of a normal detection result of the front wheel speed sensor 91F. Alternatively, the ECU 70 adjusts the abnormal detected wheel speed of the rear wheel speed sensor 91R with reference to the normal detected wheel speed of the front wheel speed sensor 91F as wheel speed closer to normal speed and executes the vehicle height reducing control mode or the vehicle height increasing control mode using the wheel speed.

vii. When one of the detected wheel speed of the front wheel speed sensor 91F and the detected wheel speed of the rear wheel speed sensor 91R is very low speed (e.g., 0 to 5 km/h) and the one detected wheel speed equal to lower than the very low speed continues for a predetermined time or longer, the ECU 70 adjusts the vehicle height on the basis of the other detected wheel speed. According to a condition that the detected wheel speed equal to or lower than the very low speed by the one wheel speed sensor continues for the predetermined time or longer, the ECU 70 estimates that the wheel speed is caused by an abnormality due to a failure such as breaking wire of a signal line of the wheel speed sensor rather than due to wheel lock by instantaneous brake operation and suspends the vehicle height reducing control mode or the vehicle height increasing control mode based on an abnormal detection result of the wheel speed sensor. For example, the ECU 70 predicts a stop of the vehicle from the abnormal detected wheel speed of the wheel speed sensor and stops performing the vehicle height reducing operation. On condition that the detected wheel speed of the wheel speed sensor returns to normal detected wheel speed, the ECU 70 predicts a stop of the vehicle from the normal detected wheel speed and enables the vehicle height reducing operation.

(G) Failure Detection Control by the Wheel Speed Sensors 91F and 91R

In the rear-wheel side vehicle height adjusting device (the front-wheel side vehicle height adjusting device 140 as well), the ECU 70 has a control function explained below in order to determine a failure, such as breaking wire of the signal line of the wheel speed sensor 91F or 91R, based on the detection results of the wheel speed sensors 91F and 91R and adjust the vehicle height on the basis of normal detected wheel speed.

i. When a change in detected wheel speed of the wheel speed sensor 91F or 91R (acceleration or deceleration calculated from the detected wheel speed) exceeds allowable acceleration or deceleration determined from engine performance, frame performance, tire performance, and the like of the vehicle, the ECU 70 determines that a failure such as breaking wire of the signals line of the wheel speed sensor 91F or 91R occurs. The detected wheel speed of the wheel speed sensor 91F or 91R is neglected and not used for adjustment of the vehicle height. Consequently, it is possible to execute the vehicle height reducing control mode or the vehicle height increasing control mode based on a normal detection result of the wheel speed sensor 91F or 91R.

ii. When the detected wheel speed of the wheel speed sensor 91F or 91R is different from predicted vehicle speed predicted from engine speed detected by the engine speed sensor 95, a shift position of the transmission detected by the shift position sensor 92, and the like, the ECU 70 determines that a failure such as breaking wire of the signal line of the wheel speed sensor 91F or 91R occurs. Detected wheel speed of the wheel speed sensor 91F or 91R is neglected and not used for adjustment of the vehicle height. Consequently, it is possible to execute the vehicle height reducing control mode or the vehicle height increasing control mode based on a normal detection result of the wheel speed sensor 91F or 91R.

iii. When the detected wheel speed of the wheel speed sensor 91F or 91R suddenly decreases, in which there is no brake signal detected by the brake sensor 96, from wheel speed equal to or larger than a specified value at which the vehicle is surely traveling to wheel speed that exceeds the specified value and causes deceleration and the wheel speed after this sudden speed decrease continues for a predetermined time or longer (depending on necessity, when a state in which the engine speed detected by the engine speed sensor 95 is equal to or larger than a predetermined value continues for the predetermined time or longer), the ECU 70 determines that a failure such as breaking wire of the signal line of the wheel speed sensor 91F or 91R occurs. The detected wheel speed of the wheel speed sensor 91F or 91R is neglected and not used for adjustment of the vehicle height. Consequently, it is possible to execute the vehicle height reducing control mode or the vehicle height increasing control mode based on a normal detection result of the wheel speed sensor 91F or 91R.

In a state in which a brake is operated and there is a brake signal, it is likely that wheel lock occurs and the rotating speed of the wheel is reduced to zero. Therefore, the state is excluded from the conditions for determining a failure of the wheel speed sensor 91F or 91R.

iv. When a state in which there is no detected wheel speed of the wheel speed sensor 91F or 91R and the engine speed detected by the engine speed sensor 95 is equal to or larger than the predetermined value continues for a predetermined time or longer, the ECU 70 determines that a failure such as breaking wire of the signal line of the wheel speed sensor 91F or 91R occurs. The detected wheel speed of the wheel speed sensor 91F or 91R is neglected and not used for adjustment of the vehicle height. Consequently, it is possible to execute the vehicle height reducing control mode or the vehicle height increasing control mode based on a normal detection result of the wheel speed sensor 91F or 91R.

In order to prevent misunderstanding of a failure of the wheel speed sensor 91F or 91R because of the above during idling in a stop, the ECU 70 cancels the determination in the case of a neutral signal of a shift position of the transmission or a clutch-off signal.

The setting of the predetermined value of the engine speed is changed between during warming-up and after the warming-up of the engine.

v. The ECU 70 monitors ON/OFF of the clutch detected by the clutch sensor 97 and, when the clutch is disengaged, cancels the determination of vehicle speed.

vi. When calculating wheel speed from frequencies of pulses output by the wheel speed sensors 91F and 91R according to the rotation of a rotor integrally rotating with the wheels (the front wheel 4A and the rear wheel 3A), the ECU 70 neglects a short pulse not equivalent to normal wheel speed of the vehicle as noise and calculates wheel speed from the frequencies of the pulses excluding the short pulse. Consequently, it is possible to prevent a malfunction of the wheel speed sensors 91F and 91R due to noise such as spike caused by ignition of the engine. An operation for discriminating the short pulse not equivalent to the normal wheel speed of the vehicle is desirably performed during a stop or during low speed traveling of the vehicle because this makes it easy to compare the short pulse and a normal pulse that changes to a long pulse during the stop or during the low speed traveling.

vii. When there is no detected wheel speed of the front wheel speed sensor 91F or the rear wheel speed sensor 91R and other vehicle speeds such as transmission vehicle speed (vehicle speed calculated from the shift position detected by the shift position sensor 92 and the engine speed detected by the engine speed sensor 95) and vehicle speed calculated from vehicle position information of a GPS or the like indicate a traveling state of the vehicle, the ECU 70 determines that a failure such as breaking wire of the signal line of the front wheel speed sensor 91F or the rear wheel speed sensor 91R occurs.

(H) Failure Substitute Control of the Vehicle Speed Sensor 91

In the rear-wheel side vehicle height adjusting device (the front-wheel side vehicle height adjusting device 140 as well), the ECU 70 has a control function explained below in order to adjust the vehicle height on the basis of correct vehicle speed information (a stop, traveling, or the like) during a failure of the vehicle speed sensor 91 (the front wheel speed sensor 91F and the rear wheel speed sensor 91R).

i. During a failure of the vehicle speed sensor 91, the ECU 70 adjusts the vehicle height using vehicle information such as a stop or traveling of the vehicle calculated from an engine speed signal detected by the engine speed sensor 95, a shift position signal of the transmission detected by the shift position sensor 92, and an ON/OFF signal of the clutch detected by the clutch sensor 97. The engine speed for determining a stop, traveling, or the like of the vehicle is changed between during warming-up and after the warming-up of the engine. Consequently, even if the vehicle speed sensor 91 fails, it is possible to execute the vehicle height reducing control mode or the vehicle height increasing control mode based on correct vehicle speed information.

ii. The ECU 70 includes a map in which vehicle speeds calculated from engine speeds and shift positions of the transmission are stored in advance. When a failure of the vehicle speed sensor 91 occurs, the ECU 70 adjusts, according to the map, the vehicle height using vehicle speed information calculated from an engine speed signal detected by the engine speed sensor 95 and a shift position signal of the transmission detected by the shift position sensor 92. Consequently, even if the vehicle speed sensor 91 fails, it is possible to execute the vehicle height reducing control mode or the vehicle height increasing control mode based on correct vehicle speed information.

iii. The ECU 70 predicts a stop state and a traveling state of the vehicle using the vehicle speed information in i and ii above and adjusts the vehicle height on the basis of a result of the prediction. For example, the ECU 70 predicts a stop of the vehicle and enables the vehicle height reducing operation.

iv. When a failure of the vehicle speed sensor 91 occurs, the ECU 70 predicts traveling or a stop of the vehicle using a throttle position (or depression at engine manifold) signal detected by the throttle sensor 98, a shift position signal of the transmission detected by the shift position sensor 92, and an ON/OFF signal of the clutch detected by the clutch sensor 97 and adjusts the vehicle height. Consequently, even if the vehicle speed sensor 91 fails, it is possible to execute the vehicle height reducing control mode and the vehicle height increasing control mode based on correct vehicle speed information.

When a neutral signal of a shift position or a clutch-off signal continues for a specified time or longer in a state in which the throttle is closed, the ECU 70 determines a stop of the vehicle and performs a vehicle height reducing operation.

The present invention is explained in detail with reference to the drawings. However, a specific configuration of the present invention is not limited to the embodiment. A change in design and the like not departing from the spirit of the present invention are included in the present invention. For example, the change-over valve 60 is not limited to the electromagnetic valve and may be electrically operable valves of other types such as a rotation type and a poppet type.

The present invention provides a vehicle height adjusting device for a motorcycle including: a damper interposed between a vehicle body and an axle; a hydraulic pump configured to perform a pumping action according to the extension/compression motion of the damper to eject hydraulic oil in the damper; a hydraulic jack configured to receive and discharge the hydraulic oil ejected by the hydraulic pump to displace vehicle height; a change-over valve configured to switch and connect the hydraulic jack to an oil reservoir chamber of the damper; a vehicle speed sensor configured to detect vehicle speed; and control means for controlling switching of the change-over valve according to a detection result of the vehicle speed sensor and adjusting the vehicle height. When a failure of the vehicle speed sensor occurs, the control means adjusts the vehicle height using vehicle speed information calculated from an engine speed signal, a shift position signal of a transmission, and an ON/OFF signal of a clutch. Consequently, in the vehicle height adjusting device for a motorcycle, when a failure of the vehicle speed sensor occurs, it is possible to adjust the vehicle height on the basis of correct vehicle speed information.

EXPLANATION OF REFERENCE NUMERALS

1 motorcycle
2 vehicle body
3, 4 axles
3A rear wheel
4A front wheel
10A, 110A dampers
40, 140 vehicle height adjusting devices
41, 141 hydraulic jacks
50, 150 hydraulic pumps
60 change-over valve
70 ECU (control means)
80 vehicle height detecting means
91 vehicle speed sensor
91F front wheel speed sensor
91R rear wheel speed sensor

What is claimed is:

1. A vehicle height adjusting device for a motorcycle comprising:
    a damper interposed between a vehicle body and an axle;
    a hydraulic pump configured to perform a pumping action according to extension/compression motion of the damper to eject hydraulic oil in the damper;
    a hydraulic jack configured to receive and discharge the hydraulic oil ejected by the hydraulic pump to displace vehicle height;
    a change-over valve configured to implement switching to connect the hydraulic jack to an oil reservoir chamber of the damper;
    a vehicle speed sensor configured to detect vehicle speed; and
    control means for controlling switching of the change-over valve according to a detection result of the vehicle speed sensor, whereby adjusting the vehicle height, wherein
    when a failure occurs in the vehicle speed sensor, the control means adjusts a vehicle height by using vehicle speed information calculated from an engine speed signal, a shift position signal of a transmission, and an ON/OFF signal of a clutch.

2. A vehicle height adjusting device for a motorcycle comprising:
    a damper interposed between a vehicle body and an axle;
    a hydraulic pump configured to perform a pumping action according to extension/compression motion of the damper to eject hydraulic oil in the damper;
    a hydraulic jack configured to receive and discharge the hydraulic oil ejected by the hydraulic pump to displace vehicle height;
    a change-over valve configured to implement switching to connect the hydraulic jack to an oil reservoir chamber of the damper;
    a vehicle speed sensor configured to detect vehicle speed; and
    control means for controlling switching of the change-over valve according to a detection result of the vehicle speed sensor, whereby adjusting the vehicle height, wherein
    the control means includes a map in which vehicle speeds calculated from engine speeds and shift positions of a transmission are stored in advance and, when a failure occurs in the vehicle speed sensor, the control means adjusts a vehicle height by using vehicle speed information calculated from an engine speed signal and a shift position signal of the transmission according to the map.

3. The vehicle height adjusting device for the motorcycle according to claim 1, wherein the control means predicts a stop state and a traveling state of the motorcycle by using the vehicle speed information and adjusts the vehicle height on the basis of a result of the prediction.

4. A vehicle height adjusting device for a motorcycle comprising:
    a damper interposed between a vehicle body and an axle;
    a hydraulic pump configured to perform a pumping action according to extension/compression motion of the damper to eject hydraulic oil in the damper;
    a hydraulic jack configured to receive and discharge the hydraulic oil ejected by the hydraulic pump to displace vehicle height;
    a change-over valve configured to implement switching to connect the hydraulic jack to an oil reservoir chamber of the damper;
    a vehicle speed sensor configured to detect vehicle speed; and
    control means for controlling switching of the change-over valve according to a detection result of the vehicle speed sensor, whereby adjusting the vehicle height, wherein
    when a failure occurs in the vehicle speed sensor, the control means predicts traveling or a stop of the vehicle by using a throttle position signal, a shift position signal of a transmission, and an ON/OFF signal of a clutch and adjusts a vehicle height.

5. The vehicle height adjusting device for the motorcycle according to claim 2, wherein the control means predicts a stop state and a traveling state of the motorcycle by using the vehicle speed information and adjusts the vehicle height on the basis of a result of the prediction.

* * * * *